May 12, 1942.　　　　B. L. SCOTT　　　　2,283,017
APPARATUS FOR FORMING ORNAMENTAL TRIMMINGS
Filed June 20, 1940　　　3 Sheets-Sheet 1

Inventor
B. L. Scott
By A. T. Randolph
Attorney

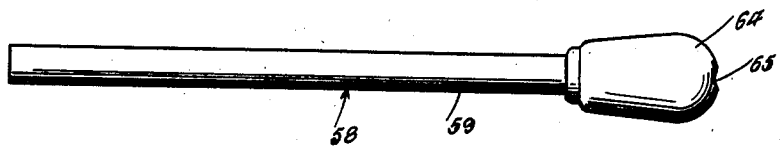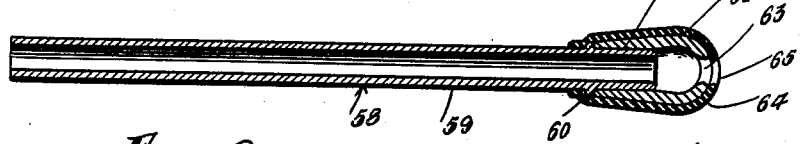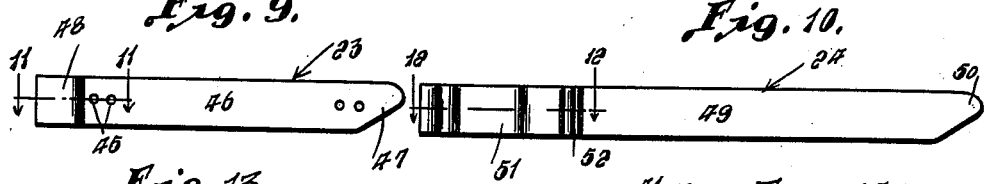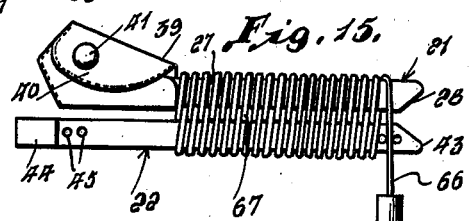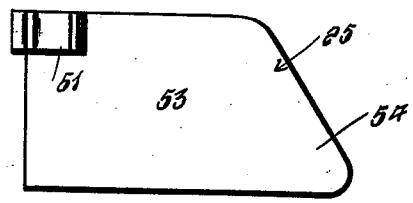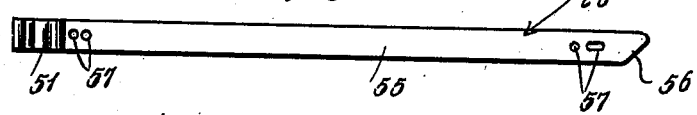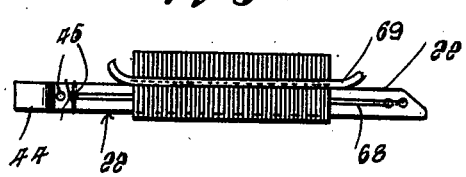

Inventor
B. L. Scott
By L. F. Randolph
Attorney

Patented May 12, 1942

2,283,017

UNITED STATES PATENT OFFICE 2,283,017

APPARATUS FOR FORMING ORNAMENTAL TRIMMINGS

Bessie L. Scott, Altus, Okla., assignor of one-half to Leona V. Curtis, Amarillo, Tex.

Application June 20, 1940, Serial No. 341,553

3 Claims. (Cl. 112—9)

This invention relates to an apparatus for forming ornamental fabric trimmings and the like and aims to provide a device on which thread or yarn may be readily wound and held to form rows of loops and to hold the loops thus formed while portions between the loops are stitched, said device including means for cutting certain or all of the rows of loops thus formed to provide tufted ornamental fringes or trimmings.

More particularly, it is an aim of the invention to provide an apparatus of simple construction capable of being economically manufactured and sold including a plurality of parts adapted for use interchangeably with one another and in various groups to form fabric trimmings or fringes from thread or yarn in various designs and figurations.

Still a further aim of the invention is to provide a cutting member forming a part of the apparatus and having means to be passed through a row of the looped yarn for guiding a cutting element for cutting corresponding portions of each of the loops of the row to form uniform tufts.

Still another aim of the invention is to provide a winding implement through which the yarn or thread is passed and by means of which the yarn or thread is wound on the resilient strips forming a supporting frame, said implement having means for tensioning the thread or yarn passing therethrough to insure uniformity in the winding.

Figure 1:
Figure 2:
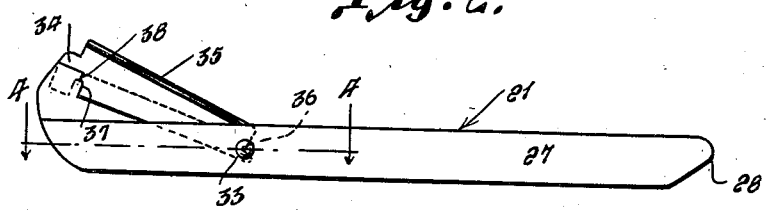
Figure 3:
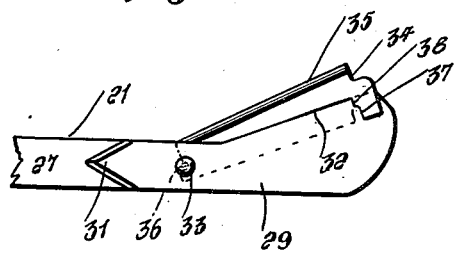
Figure 4:
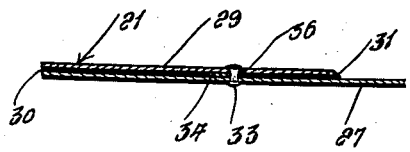
Figure 5:
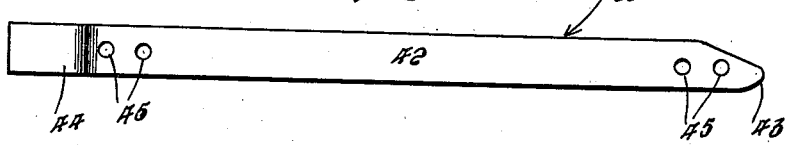
Figure 6:
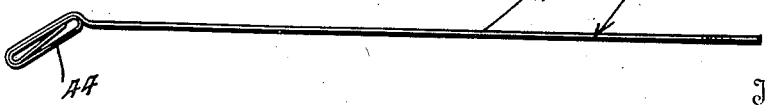
Figure 17:
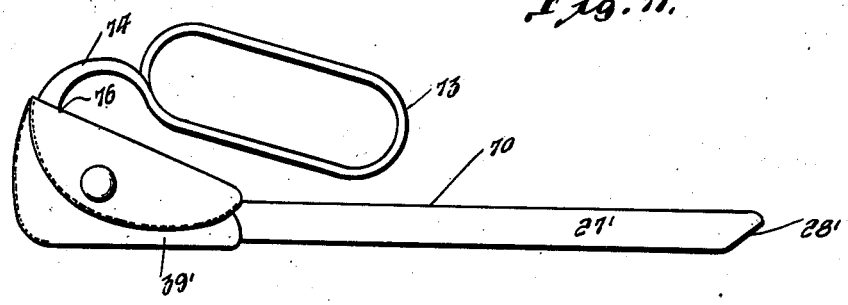
Figure 18:
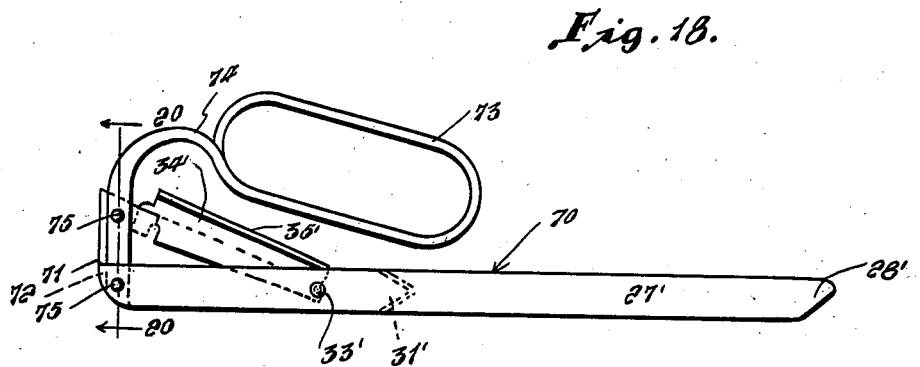
Figure 19:
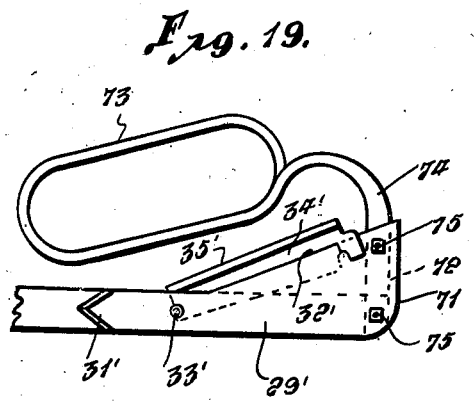
Figure 20:

Other objects and advantages of the invention will hereinafter become more fully apparent from the following description of the drawings, which illustrate a preferred embodiment thereof, and wherein:

Figure 1 is a side elevational view of one of the implements of the apparatus, showing a sheath applied thereto for enclosing a cutting blade thereof, Figure 2 is a view similar to Figure 1, but with the sheath removed, Figure 3 is a fragmentary side elevational view looking toward the opposite side of the element, as shown in Figures 1 and 2, Figure 4 is a longitudinal, horizontal sectional view taken substantially along the plane of the line 4—4 of Figure 2, Figure 5 is a side elevational view, of another implement forming a part of the apparatus, Figure 6 is a top plan view of the same, Figure 7 is a plan view of the yarn or thread winder, Figure 8 is a longitudinal, central sectional view of the same, Figures 9 and 10 are side elevational views of other implements of the apparatus, Figure 11 is a longitudinal horizontal sectional view taken substantially along the plane of the line 11—11 of Figure 9, Figure 12 is a similar view taken substantially along the plane of the line 12—12 of Figure 10, Figures 13 and 14 are views similar to Figures 9 and 10 of other implements of the apparatus, Figure 15 is a side elevational view showing certain of the parts in use for forming an ornamental fringe or trimming from thread or yarn, which is shown partly applied thereto, Figure 16 is a side elevational view showing another of the elements of the apparatus with a partially completed ornamental trimming or fringe disposed thereon, Figure 17 is a side elevational view of the cutting device with its sheath applied, Figure 18 is a similar view with the sheath removed, Figure 19 is a side elevational view showing one end of the opposite side of the cutting implement, and Figure 20 is a transverse vertical sectional view taken substantially along the plane of the line 20—20 of Figure 18.

Referring more particularly to the drawings, wherein like reference characters designate like or corresponding parts throughout the different views, the reference characters 21, 22, 23, 24, 25, and 26 designate frame members adapted to be used in groups of two, or more to form frames on which are adapted to be wound thread or yarn, as illustrated in Figures 15 and 16, to form ornamental fringes and trimmings and the like.

The frame member 21 includes a strip 27 of relatively thin resilient material, such as metal, Celluloid, wood and the like. The strip 27 is provided with a tapered forward end 28. A strip 29 is connected to one side of the opposite end of the strip 27, as by means of soldering or welding at 30. The forward end 31 of the strip 29, as best seen in Figure 3, is tapered to a point, and is beveled on its outer side to form a smooth connection with the strip 27, so that yarn or thread, when wound thereon, will not snag on the connected portion. The strip 29, adjacent its rear end, is enlarged to provide an edge 32 which projects upwardly from the strip 27 at an oblique angle to its upper, longitudinal edge. A rivet 33 connects the strips 27 and 29, adjacent the forward end 31 of the strip 29 for spacing the intermediate portion of the strip 29 from the contiguous portion of the strip 27, as best seen in Figure 4. A blade 34, which is provided with a longitudinal cutting edge 35, is provided with a notch 36 in one end thereof for engaging the rivet 33 for positioning one end of the blade 34 between the strips 27 and 29, as best seen in Figures 2 to 4. The blade 34 is provided with a notch 37 in its back edge and adjacent its opposite end, and with an inwardly projecting slit which communicates with the inner end of the notch 37, said notch 37 and slit 38 being adapted to engage the oblique edge 32, in the manner as illustrated in Figures 2 and 3, to combine with the notch 36 to detachably mount the blade 34 on the frame member 21. The blade 34 as thus mounted, is disposed with its cutting edge 35 projecting outwardly from the oblique edge 32 and upwardly and rearwardly from the upper longitudinal edge of the strip 27. The blade 34 is preferably very thin and relatively resilient and may be formed from a razor blade, or from steel of substantially the same thickness as a conventional safety razor blade.

A sheath 39, formed of leather or other flexible material is provided to enclose the blade 34 and the adjacent portions of the strips 27 and 29. The sheath 39 is provided with a flap 40 closed by means of snap fastenings 41 and which is adapted to be readily opened for removing the sheath 39 when the blade 34 is to be used for cutting, as will hereinafter be described.

The frame 22, illustrated in Figures 5 and 6, comprises a strip 42, formed of a material corresponding to the strip 27. The strip 42 is provided with a forward tapered end 43. The opposite, rear end of the strip 42 is folded upon itself a plurality of times and disposed at an oblique angle to the plane of the frame 22 to form a stop 44. Adjacent each of its ends, the strip 42 is provided with a pair of spaced apertures 45.

The frame 23, as illustrated in Figures 9 and 11, is also formed from a strip 46, of a material corresponding to that of which the strip 27 is formed. The strip 46 is provided with a tapered end 47 corresponding to the end 28, while the opposite end of the strip 46 is looped and turned back upon itself, as best illustrated in Figure 11, to form a stop 48. The frame 23 is also provided with pairs of apertures 45, which are arranged in the same manner as the corresponding apertures of the frame 22.

The frame 24, illustrated in Figures 10 and 12, is formed from a strip 49 of corresponding material and yieldability to the strips, heretofore described. The strip 49 is provided with a tapered forward end 50. The opposite, rear end of the strip 49 is turned back to form a yieldable clip 51 having a free end 52 which projects outwardly from one side of the strip 49 and at an oblique angle thereto to form a stop which extends toward the tapered end 50.

The frame 25, illustrated in Figure 13, is formed from a strip or plate 53, which may be of the same material as the strip 27, and which is substantially wider than the strips of any of the frames heretofore described. The strip or plate 53 is provided with a beveled forward end 54, at its opposite end, and adjacent one of its longitudinal edges, the plate 53 is provided with a clip 51, corresponding to the clip 51 of the frame 24, except that it is reduced in length.

The frame 26, illustrated in Figure 14, is formed from a strip 55, of the same material as the strip 27, and which is substantially narrower than the strips of any of the frames heretofore described. The strip 55 is provided with a tapered forward end 56 corresponding to the ends 47 and 50, and at its opposite end, the strip 55 is provided with a clip 51 corresponding to the clip of the frame 24, except that it is shorter and narrower. Adjacent its ends, the strip 55 is provided with pairs of openings 57 which may correspond to the openings 45 or which may include, in each pair, a circular opening and an oblong opening, as illustrated adjacent the end 56.

A winding implement, designated generally 58, as illustrated in Figures 7 and 8, comprises an elongated tube 59 having an annular rib 60 adjacent one end thereof, which forms a shank portion 61 therebeyond. A cap 62 is fixedly or detachably mounted on the shank portion 61 and is provided with an aperture 63 in its outer end, which alines with the bore of the tube 59. The tube 59 and the cap 62 may be formed of any suitable material which is rigid, as for example wood, bone or glass. A nipple 64, which is preferably formed of a resilient material, such as rubber, is mounted over the cap 62 and held thereon by frictional engagement therewith and with the rib 60. The nipple 64 is provided with an aperture 65 in its outer end which registers with the aperture 63.

To form ornamental trimmings or fringes, not shown, from a strand of thread or yarn, shown at 66 in Figure 15, a group of any two or more of the frames 21 to 26 inclusive, are arranged in spaced apart relationship to each other in the manner as frames 21 and 22 are positioned relatively to each other in Figure 15. The strand of thread 66 is then passed through the winding implement 58 from its capped end 62 toward its opposite end. The strand 66 is then wound onto the strips, of the frames being used, which in this case would be strips 27 and 42 of frames 21 and 22. The implement 58 is employed to wind the thread 66, which is wound so as to form loops on the strips of the two frames 21 and 22 by alternately looping the thread around said frames and by crisscrossing the thread at 67 in the space between the adjacent edges of the frames. After the winding, as illustrated in Figure 15, has been completed, the crisscrossed portion 67 is stitched in any suitable manner, as on a sewing machine, not shown, to thereby form two rows of loops. When one of the frames being employed, as in illustration of Figure 15, is the frame 21, the sheath 39 is applied over the blade 34 during the winding operation to form a stop to limit the movement of the thread 66 toward the blade 34 to hold the thread out of engagement with the blade. After the twisted portion 67 has been stitched, the sheath 39 is removed and the frame 21 is then moved forwardly through the row of loops which has been formed by its strip 27 to cause the cutting edge 35 to successively engage and cut the outer portion of each of the loops and thereby form a tuft. The stop 44 forms an abutment to prevent the loops of the other row from slipping off of the rear end of the frame 22, and this stop as well as the stop 48 and clips 51 may in addition be employed to hold the free end of the thread 66 during the winding operation. The aperture 65 in the nipple 64 is adapted to frictionally engage the thread 66 being drawn therethrough to tension the thread as it is wound onto the frames to insure uniformity in the loops being formed therefrom.

From the foregoing description it is considered that it will be apparent that any group of two or more of the frames 21 to 26, inclusive, can be grouped in the same manner as the frames 21 and 22 are grouped in Figure 15, to form two or or more rows of loops from a length of thread or yarn and such rows of loops may be of the same or different widths, as where the frames 25 and 26 are employed, to form fabrics of various designs.

Where it is desired to form a curved trimming or fringe having a looped row and a tufted row, the frames 21 and 22 may be employed, for example, and a cord 68 may be laced through the pairs of apertures 45, in the manner as illustrated in Figure 16. After the winding has been completed the portion 67 is stitched, and the loops formed by the frame 21 cut, in the manner as heretofore described to form a row of tufts, the remaining row of loops may be removed with the cord 68 from the frame 22 after which the cord 68 may be drawn up to draw up the row of loops through which it is extending to form a fringe or trimming having a curved configuration.

When desired, the fringe or trimming thus formed may be further ornamented by means of a tape 69, as illustrated in Figure 16, which is disposed in the crisscrossed portion 67. A cutting implement, designated generally 70, and illustrated in Figures 17 to 20, inclusive, includes the strips 27' and 29' which correspond substantially to the strips 27 and 29 of the frame 21 and which are connected in the same manner. The cutting implement 70 also includes the blade 34' corresponding to the blade 34 which is enclosed in a sheath 39' similar to the sheath 39. The blade 34' is mounted in the same manner in the implement 70, as the blade 34 is mounted in the frame 21. The strips 27' and 29' are modified to the extent that they are substantially narrower than the strips 27 and 31 and are extended slightly at their rear ends to provide the portions 71, provided with the spaced openings 72. A handle 73 comprises an elongated, substantially rigid loop having a shank 74 which projects from one end thereof. The shank 74 is curved and is provided adjacent its free end with spaced apertures to aline with the opening 72 for receiving nut and bolt fastenings 75 for detachably connecting the handle 73 to the portions 71 and for positioning the under side of the handle above and substantially parallel to the cutting edge 35' of the blade 34'. The sheath 39' is provided with an opening 76 through which the shank 74 is adapted to project, as best illustrated in Figure 17.

The cutting implement 70 is especially adapted for use where it is desired to cut two or more rows of loops formed by two or more of the group of frames 21 to 26, inclusive. The cutting implement 70 is also used for cutting a row or rows of loops wound on a group of frames not including the frame 21. The strip 27' is adapted to be as narrow as, or slightly narrower than, the strip of the narrowest frame, as for example the strip 55, so that the strip portion 67 may be inserted into a row of loops formed by any one of the frames, and while held by the handle 73, moved relatively to the row of loops for causing the blade 34' to sever corresponding portions of each of the loops, of the row. The implement 70 is also adapted to be used as a frame in the same manner as the frame 21, with its sheath 39' applied and with the handle either applied or detached, as desired.

Various modifications and changes in the construction and arrangement of the elements forming the apparatus are contemplated and may obviously be resorted to, as only a preferred embodiment of the invention has been disclosed.

I claim as my invention:

1. An apparatus for forming ornamental fringes or the like, including an elongated, relatively thin loop forming strip of resilient material, a second strip secured at its ends to spaced portions of said first strip and disposed adjacent one end thereof, means for spacing said strips intermediate of the ends of said last mentioned strip, said last mentioned strip having an enlarged portion forming an outwardly projecting edge disposed at an oblique angle to the edges of said first mentioned strip, and a blade provided with a cutting edge, said blade having a notch at one end for detachably engaging said spacing means, and said blade being provided with a notch in its back edge and adjacent its opposite end for engaging the oblique edge of said last mentioned strip for positioning the cutting edge beyond said oblique edge and substantially parallel thereto.

2. A device as in claim 1, comprising a sheath of flexible material for enclosing said cutting blade.

3. A device as in claim 1, comprising a handle, a curved shank projecting from one end of said handle, the free end of said shank being detachably secured to complementary ends of said strips for positioning the handle above and substantially parallel to the cutting edge of said blade.

BESSIE L. SCOTT.